United States Patent
Wibling et al.

(10) Patent No.: US 9,384,023 B2
(45) Date of Patent: Jul. 5, 2016

(54) VM INTER-PROCESS COMMUNICATION

(71) Applicant: VMware, Inc., Palo Alto, CA (US)

(72) Inventors: Gustav Seth Wibling, Aarhus (DK); Jagannath Gopal Krishnan, Harper Woods, MI (US)

(73) Assignee: VMware, Inc., Palo Alto, CA (US)

( * ) Notice: Subject to any disclaimer, the term of this patent is extended or adjusted under 35 U.S.C. 154(b) by 47 days.

(21) Appl. No.: 13/973,652

(22) Filed: Aug. 22, 2013

(65) Prior Publication Data

US 2013/0339953 A1    Dec. 19, 2013

Related U.S. Application Data

(63) Continuation of application No. 12/272,565, filed on Nov. 17, 2008, now Pat. No. 8,521,966.

(60) Provisional application No. 60/988,704, filed on Nov. 16, 2007.

(51) Int. Cl.
*G06F 12/00* (2006.01)
*G06F 13/00* (2006.01)
*G06F 13/28* (2006.01)
*G06F 9/455* (2006.01)
*G06F 9/50* (2006.01)
*G06F 9/54* (2006.01)
*G06F 12/10* (2016.01)

(52) U.S. Cl.
CPC .......... *G06F 9/45533* (2013.01); *G06F 9/5016* (2013.01); *G06F 9/544* (2013.01); *G06F 12/109* (2013.01); *G06F 2212/656* (2013.01)

(58) Field of Classification Search
CPC ... G06F 9/45533; G06F 9/5016; G06F 9/544; G06F 12/109; G06F 2212/656
USPC ........................................................ 711/147
See application file for complete search history.

(56) References Cited

U.S. PATENT DOCUMENTS

| | | | |
|---|---|---|---|
| 6,519,594 B1 * | 2/2003 | Li | 719/312 |
| 6,725,289 B1 * | 4/2004 | Waldspurger et al. | 710/9 |
| 6,728,746 B1 | 4/2004 | Murase et al. | |
| 7,089,377 B1 * | 8/2006 | Chen | 711/147 |
| 7,111,086 B1 | 9/2006 | Ecoleston et al. | |
| 7,111,145 B1 * | 9/2006 | Chen et al. | 711/206 |

(Continued)

OTHER PUBLICATIONS

IBM Corp., "z/VM CP Programming Services ..." Published: May 2006.

*Primary Examiner* — Sheng-Jen Tsai (57) ABSTRACT

A method for enabling inter-process communication between a first application and a second application, the first application running within a first context and the second application running within a second context of a virtualization system is described. The method includes receiving a request to attach a shared region of memory to a memory allocation, identifying a list of one or more physical memory pages defining the shared region that corresponds to the handle, and mapping guest memory pages corresponding to the allocation to the physical memory pages. The request is received by a framework from the second application and includes a handle that uniquely identifies the shared region of memory as well as an identification of at least one guest memory page corresponding to the memory allocation. The framework is a component of a virtualization software, which executes in a context distinct from the context of the first application.

18 Claims, 7 Drawing Sheets

(56) References Cited

U.S. PATENT DOCUMENTS

| | | | |
|---|---|---|---|
| 7,222,221 B1* | 5/2007 | Agesen et al. | 711/141 |
| 8,521,966 B2* | 8/2013 | Wibling | G06F 9/5016 711/147 |
| 8,544,004 B2* | 9/2013 | Fultheim | G06F 9/45533 718/1 |
| 2003/0135658 A1 | 7/2003 | Haggar et al. | |
| 2004/0024794 A1* | 2/2004 | Jain | G06F 9/546 |
| 2004/0034664 A1* | 2/2004 | Jain | G06F 17/30371 |
| 2004/0226023 A1* | 11/2004 | Tucker | 719/315 |
| 2005/0039180 A1* | 2/2005 | Fultheim et al. | 718/1 |
| 2005/0044551 A1 | 2/2005 | Sodhi | |
| 2005/0102670 A1* | 5/2005 | Bretl et al. | 718/1 |
| 2005/0102671 A1* | 5/2005 | Baumberger | 718/1 |
| 2005/0114586 A1 | 5/2005 | Brice et al. | |
| 2005/0188068 A1 | 8/2005 | Kilian | |
| 2006/0036570 A1 | 2/2006 | Schaefer et al. | |
| 2006/0130060 A1* | 6/2006 | Anderson et al. | 718/1 |
| 2006/0259292 A1 | 11/2006 | Solomon et al. | |
| 2006/0259818 A1 | 11/2006 | Howell et al. | |
| 2007/0143315 A1 | 6/2007 | Stone | |
| 2008/0086729 A1* | 4/2008 | Kondoh et al. | 718/1 |
| 2008/0140846 A1 | 6/2008 | Rehm | |
| 2009/0025009 A1 | 1/2009 | Brunswig et al. | |
| 2009/0144510 A1* | 6/2009 | Wibling | G06F 9/5016 711/147 |
| 2012/0102135 A1* | 4/2012 | Srinivasan et al. | 709/213 |
| 2013/0339568 A1* | 12/2013 | Corrie | 711/6 |
| 2014/0189195 A1* | 7/2014 | Chen | G06F 9/5016 711/6 |
| 2014/0229686 A1* | 8/2014 | Tsirkin | 711/147 |
| 2014/0310473 A1* | 10/2014 | Bilas | G06F 11/00 711/129 |
| 2015/0039838 A1* | 2/2015 | Tarasuk-Levin et al. | 711/137 |

* cited by examiner

VM INTER-PROCESS COMMUNICATION

RELATED APPLICATIONS

This application is a continuation which claims priority from U.S. patent application Ser. No. 12/272,565, filed Nov. 17, 2008, entitled "VM Inter-Process Communication," now issued as U.S. Pat. No. 8,521,966, which claimed benefit from Provisional Patent Application Ser. No. 60/988,704, filed Nov. 16, 2007.

BACKGROUND

Virtual machines (VMs) are software abstractions of physical computer systems. VMs are generally designed to execute a software stack in a manner that is substantially indistinguishable from the manner in which it would execute on physical hardware. The term, "software stack" refers a set of software subsystems or components needed to provide a fully functional system, and commonly includes an operating system (OS) and one or more interacting applications running on the OS. VMs are often used as test beds for software development and in the server arena where a plurality of VMs co-exist on a single physical computer.

Some interface is generally required between guest software within a VM and various hardware components and devices in the underlying physical hardware platform. This interface—which may be referred to generally as "virtualization software"—may include one or more software components and/or layers, possibly including one or more of the software components known in the field of VM technology as "VM monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. The term, "hypervisor" can also refer to all virtualization enabling software, including host executables, device simulators, and drivers. However, the term "hypervisor" is sometimes used instead to mean some variant of a VMM alone, which interfaces with some other software layer(s) or component(s) to support the virtualization. In some systems, some virtualization code is included in at least one "superior" VM to facilitate the operations of other VMs. In other systems, specific software support for VMs may be included in the host OS itself. Finally, functionality that has traditionally been implemented in software could also or alternatively be implemented in hardware or firmware. Thus, the term "virtualization software" may be thought of more broadly as virtualization logic. Although the invention is described below in terms of virtualization software, it may also be implemented partially in hardware or firmware.

When a first user-level software program executing within one physical server communicates with a second user-level software program executing within another physical server, the two software programs typically communicate over a physical or wireless network connection such as a local area network (LAN), a wide area network, (WAN) such as the Internet, or some combination of the two. A network can generally be defined as a technology placing one computing device or system in communication with at least one other computing device or system. A common type of network connection is commonly referred to by the term "TCP/IP" ("transport connect protocol/Internet protocol") which in turn refers to two software layers of a protocol stack. These layers require data being transmitted be encapsulated into network packets that are typically about 1.5 kilobytes each. Each network packet includes a header containing address and sequence information as well as an indication of the size of the packet. The address defines a destination endpoint, and the sequence information enables a receiver to reassemble the data in proper order, in case the packets are received out of sequence. Once the data is encapsulated into data packets, it is passed to a hardware network layer, such as an Ethernet, which is a physical network adhering to the "IEEE 802.3" standard promulgated by the Institute of Electrical and Electronics Engineers (IEEE). There are also many other network technologies, such as, e.g., token-ring, WiFi, Bluetooth, IEEE 1394 (often referred to by the trade name "Firewire"), USB (Universal Serial Bus), and Fibre Channel, among others, each requiring particular manipulations of the data being transmitted. Because each message must be packaged in one or more packets a significant amount of processing is required for one computer to communicate to another over a network protocol. This additional processing may lead to latencies and reduction in throughput.

Virtual network connections implemented by virtualization software allow applications executing on respective VMs, but the same physical computer, to communicate with one another in the same manner as they would if they were executing natively on separate physical computers. Although no physical network is present, communication over virtual networks still requires breaking up a stream of data into individual network packets. The principal of a virtual network operating within disparate entities within a computer system is well known. An example of this technology is described in U.S. Pat. No. 7,111,086, which was granted to VMware, Inc. on Sep. 19, 2006.

Existing virtualization software is available that permits tools to be installed within a VM that permit communication with some component of the virtualization layer. This mechanism is sometimes referred to as a "backdoor" or "hypercall." The term "hypercall" is a contraction of the phrase, "hypervisor call." The hypercall allows communication only between the guest OS and the virtualization layer, and does not provide for communication between applications or components residing on different guest VMs but on the same physical host platform.

SUMMARY

The embodiments described herein provide inter-process communication mechanisms that use shared memory or notifications to allow applications running in respective virtual machines to communicate with one another.

In one embodiment, a method enables inter-process communication between a first application and a second application. The first application runs within a first context and the second application runs within a second context of a virtualization system. The method includes receiving a request to attach a shared region of memory to a memory allocation, identifying a list of one or more physical memory pages defining the shared region, and mapping guest memory pages corresponding to the allocation to the physical memory pages. The request is received by a framework from the second application and includes a handle that uniquely identifies the shared region of memory as well as an identification of at least one guest memory page corresponding to the memory allocation. The framework is a component of a virtualization software which executes in a context distinct from the context of the first application.

In another embodiment, a tangible machine readable medium embodying computer instructions causes a computer system to implement the method described above.

In yet another embodiment, a method provides inter-process notifications between a first application and a second application.

DETAILED DESCRIPTION

Figure 1:
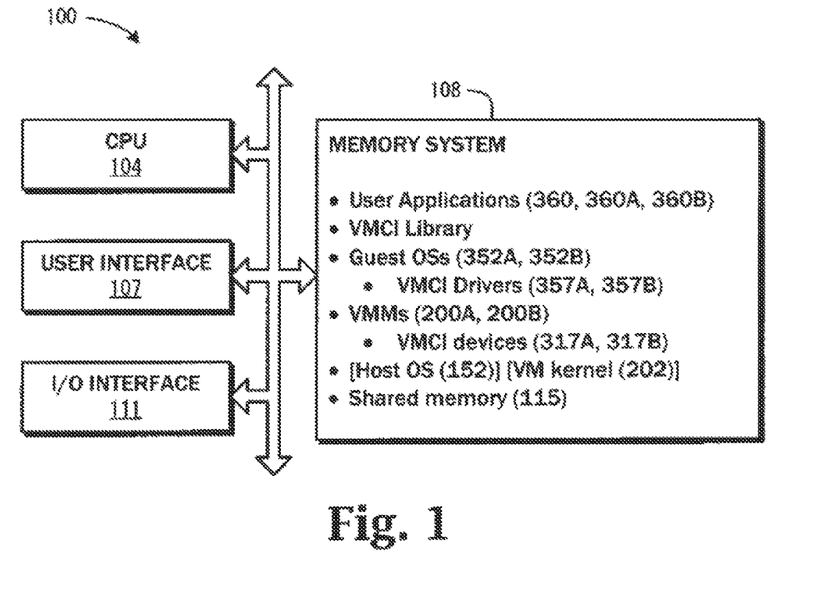
FIG. 1 shows a physical view of an exemplary computer system.

FIG. 1 shows a physical view of computer system 100. Computer system 100 includes central processing unit (CPU) 104, user interface 107, and in/out (I/O) interface 111. CPU 104 may comprise one or more physical processing cores, wherein multiple cores share a single device or chip, or are spread across a plurality of devices and/or chips. Each processing core includes circuitry capable of executing software instructions, and may include other features (not shown) well known in the field, such as one or more caches, translation buffers, and arithmetic logic units. User interface 107 may or may not be present, but if present, may include an interface for sending display data to an external display (not shown) or keyboard and mouse inputs for receiving user inputs. Other user interface devices can also be implemented. In/out (I/O) interface 111 may comprise, for example, one or more network interfaces, placing computer system 100 in communication with other computers and devices on a physical network. Memory system 108 can include a plurality of memories such as volatile random access memory and one or more nonvolatile data storage devices (e.g., computer disk drives, optical media, etc.). Memory system 108 can therefore be considered a tangible computer readable medium which is accessible to and readable by CPU 104 for storing computer instructions and data. Memory system 108 stores software and data for a variety of software components, some of which are represented (for illustrative purposes only) in FIGS. 1-3.

Figure 2:
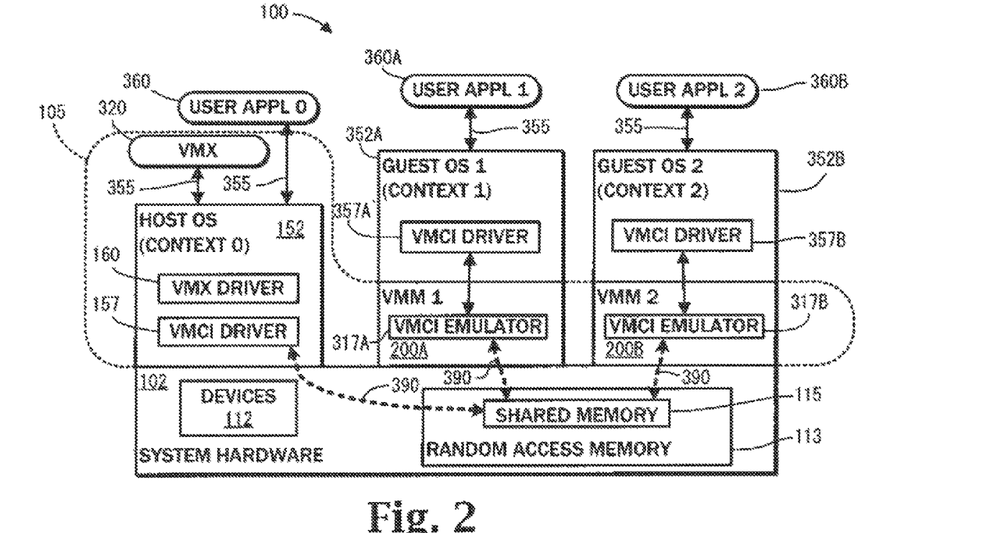
FIGS. 2 and 3 show an overview of logical views of the computer system of FIG. 1 in a hosted and unhosted configuration, respectively.
Figure 3:
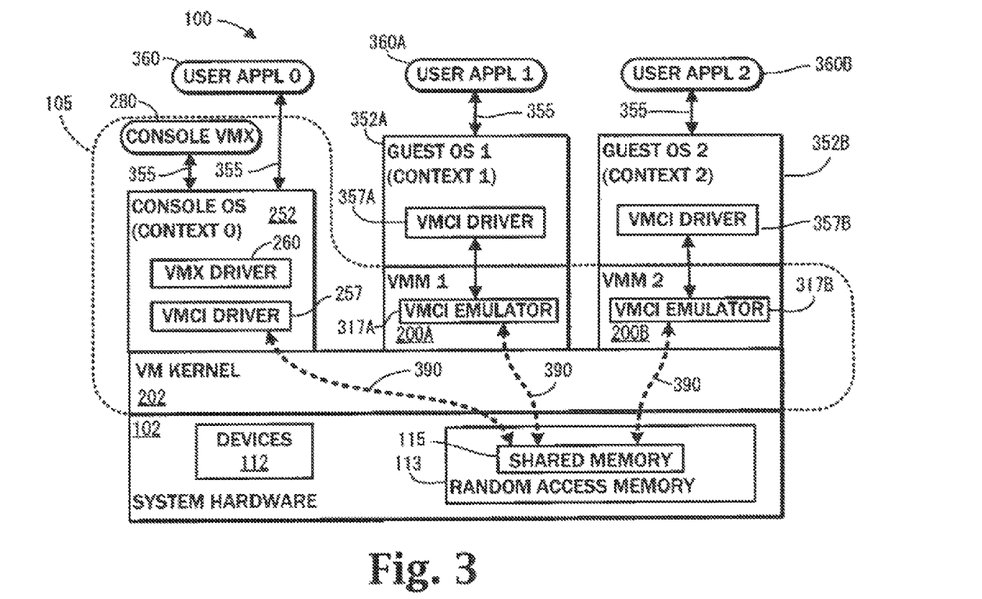

FIG. 2 shows an overview of a logical representation of computer system 100 in a hosted configuration. FIG. 3 shows an overview of a logical representation of computer system 100 in an unhosted configuration. In FIGS. 2 and 3, system hardware 102 includes hardware resources and devices described above with reference to FIG. 1. Note that FIGS. 2 and 3 show virtual machine monitors (VMMs) 200A, 200B, as entities separate from other components of virtualization software 105. Virtualization software 105 is located logically between each guest operating system (OS) 352A, 352B and the underlying hardware platform, i.e., system hardware 102.

In the hosted configuration example shown in FIG. 2, virtualization software components, include an executable program labeled "VMX" which, in general terms, provides a user interface to the guest systems and various control functions, handles device emulation and I/O, allocates memory, and loads virtual machine monitors (VMMs) 200A, 200B. Thus, in the hosted virtualization system shown in FIG. 2, host OS 152 interfaces with the physical devices, including user interface 107 and I/O interface 111 (FIG. 1), on behalf of VMMs 200A, 200B. To gain sufficient control over system hardware 102 to allow isolation of the VMMs 200A, 200B, a device driver referred to herein as VMX Driver 160 is loaded into host OS 152. This driver, sometimes referred to as "VMmon" or "vmx86," but can have any arbitrary name, may be provided to facilitate context switching away from the host OS to the VMMs, lookup and lock down memory in the host OS so that the VMMs can use it, and pass interrupts and interrupt requests (IRQs) back to the host OS that are delivered while a VMM is running. The basic functionality of hosted virtualization systems is well understood by those skilled in the art. Additional details related to a hosted virtualization system are provided by way of example in U.S. Pat. No. 6,496,847, which was granted on Dec. 17, 2002 to VMware, Inc.

In the unhosted configuration example shown in FIG. 3, virtualization software 105 includes virtual machine (VM) kernel 202, in addition to VMMs 200A, 200B. VM kernel 202 manages and interfaces with system resources, including external devices, and provides various device emulation. Console OS 252 is optional, but may be provided in a context (sometimes referred to as a "world") provided by VM kernel 202. Console OS 202 provides a user interface to control virtualization operations and interact with guest OSs. In one embodiment, console OS 252 includes a modified Linux kernel that allows itself to be taken over by VM kernel 202. In addition, console OS 252 may be permitted privileged access to system hardware 102 for specialized operations by VM kernel 202. General operational details of unhosted virtualization systems are well understood by those skilled in the art. Additional details related to the unhosted configuration are provided by way of example, in U.S. Pat. No. 6,961,941, which issued on Nov. 1, 2005.

While FIGS. 2 and 3 represent two exemplary implementations of virtualization layers, it should be recognized that there are many other possible virtualization configurations, and the specific configurations presented here are presented in simplified form for the sake of illustration and should not be considered limiting.

Memory system 108 (FIG. 1) contains user applications 360, 360A, and 360B, which may be implemented in a virtualized computer system as shown by way of example in FIGS. 2 and 3. By "user application," it is meant that these applications execute with the processor set to a user-level privilege state. Each user application may comprise a plurality of modules (not shown) that interoperate with one another to form a complete application. Furthermore, each user application 360, 360A, and 360B may interact with one another to provide some service. For example, first user application 360A may be an application that accesses a database, and second user application 360B, may be the database accessed by first user application 360A. In another example, first user application 360A may be a logging application for storing logs generated by other user applications, such as second user application 360B, which may be, e.g., a web server.

Each user application 360A, 360B executes using a respective one of first and second guest OSs 352A, 352B. Each guest OS is stored in memory system 108 as shown in FIG. 1, but can be implemented in a virtualized system as shown in FIGS. 2 and 3. Arrows 355 in FIGS. 2 and 3 represent normal OS system calls, memory allocation, scheduling, etc.

Each guest OS 352A, 352B operates in conjunction with a respective one of first and second VM monitors (VMMs) 200A, 200B. Each VMM 200A, 200B provides a software abstraction of a physical machine to the respective guest OS, such that the OS functions in a manner that is substantially indistinguishable from the manner in which it would function if it executed directly on physical hardware, at least for some implementations of the invention. This software abstraction is often referred to as a "VM." A VM can be considered to be a collection of virtual resources, including virtual CPUs, virtual disks, virtual network interfaces, guest physical memory, and various other virtual devices and interfaces. These virtual hardware resources, when viewed from the perspective of an OS or application, can be treated the same as actual physical hardware, and in fact no modification of the OS or application software is generally required for equivalent operation of an OS on a VM (although some virtualization systems, sometimes referred to as "para-virtualization" do require that the OS be specifically constructed or modified for use with the virtual hardware). The term, "guest physical memory" refers to memory that appears to the guest OS as physical memory, but is virtualized by underlying virtualization software 105, and is therefore distinguished from traditional notions of virtual memory, which is managed and virtualized in part by the OS.

With respect to these virtual resources, it should be recognized that each VMM 200A, 200B, exports an interface to guest OSs 352A, 352B that is consistent with an expected interface provided by physical system resources. The virtual resources may be backed up by physical resources. For example, in the case of memory, guest physical memory is backed up by memory system 108 (FIG. 1), which exists as physical hardware, and a virtual network interface may be backed up by I/O interface 111 (also in FIG. 1).

For instance, randomly accessible memory (RAM) is virtualized, in various embodiments, as follows: Each user application 360A, 360B that runs on a guest OS 352A, 352B is provided a virtual address space by its corresponding guest OS so that the application may address randomly accessible memory 113 using virtual addresses (VAs). In various embodiments, each VA comprises a virtual page number (VPN) and an offset into the indicated page. The VAs are then mapped by the guest OS to guest physical addresses (GPAs), each of which comprise a guest physical page number (GPPN) and an offset, to address the guest physical memory. The same offset is usually used in both a VA and its corresponding PA, so that only the VPN needs to be converted into a corresponding GPPN.

An extra level of addressing indirection is typically implemented by virtualization software 105 in that a VPN issued by an application running in a guest VM is remapped twice to determine which page of system memory 113 is intended. The first mapping is provided by guest OSs 352A, 352B, which translate the VPN into the corresponding GPPN in the conventional manner. In a manner of speaking, the guest OS "believes" that it is directly addressing the actual hardware memory, but in fact it is not. A memory management module (not shown), located typically somewhere in virtualization software 105, e.g., in the VMM, performs the second mapping by taking the GPPN issued by the guest OS and mapping it to a hardware (or "machine") physical page number PPN that can be used to address physical system RAM 113.

The principles of virtualization of physical resources are generally understood in the art. For example, U.S. Pat. No. 6,725,289, granted on Apr. 20, 2004, presents an exemplary technique for virtualizing physical memory.

VM communication interface (VMCI) drivers 357A, 357B, are installed on respective guest OSs 352A, 352B. Furthermore, VMMs 200A, 200B each include, respectively, virtual VMCI emulators 317A, 317B. Each VMCI emulator 317A, 317B, is a software component, routine, or module of its respective VMM. Emulators 317A, 317B, in a manner described in further detail below, export an interface to the VM and guest OS running in the VM. The interface is consistent with physical devices with which the VM and guest OS are capable of interacting and allow the system to trap in and out of the VM context to handle communication between the VMs and virtualization software 105. VMCI drivers 157, 257, respectively installed in host OS 152 shown in FIG. 2 and console OS 252 shown in FIG. 3, can call directly into virtualization software 105 to carry out functionality without requiring an emulator. As will be described in further detail below, each VMCI driver and VMCI emulators provide a data path 390 employing shared physical memory 115, enabling high bandwidth, low latency communication between first and second user applications 360A, 360B.

Those skilled in the art will recognize that each of the software components described above with reference to FIGS. 1-3 occupy physical memory space in memory system 108 shown in FIG. 1, but may not all be present at any one time in a single resource. For example, computer system 100 (FIG. 1) and OS 152 (FIG. 2) or VM kernel 202 (FIG. 3) may include a virtual memory system that swaps pages of randomly accessed data that are not frequently accessed to a mass storage device to expand virtual memory space beyond the limits of available physical RAM. Likewise, guest OSs 352A, 352B, working in conjunction with a virtual processor and virtual memory management system provided by VMMs 200A, 200B, may implement a virtual memory system that swaps virtual RAM to a virtual disk, which is backed up by a physical mass storage device. Various software components may be maintained separately in mass data storage devices. For example, host OS 152 may be stored on a local disk and VMMs 200A, 200B may be stored on a remote network drive. Although each component may be distributed throughout the physical memory system, they are, in various embodiments, still logically related to other components as described above with reference to FIGS. 2 and 3.

Figure 4:
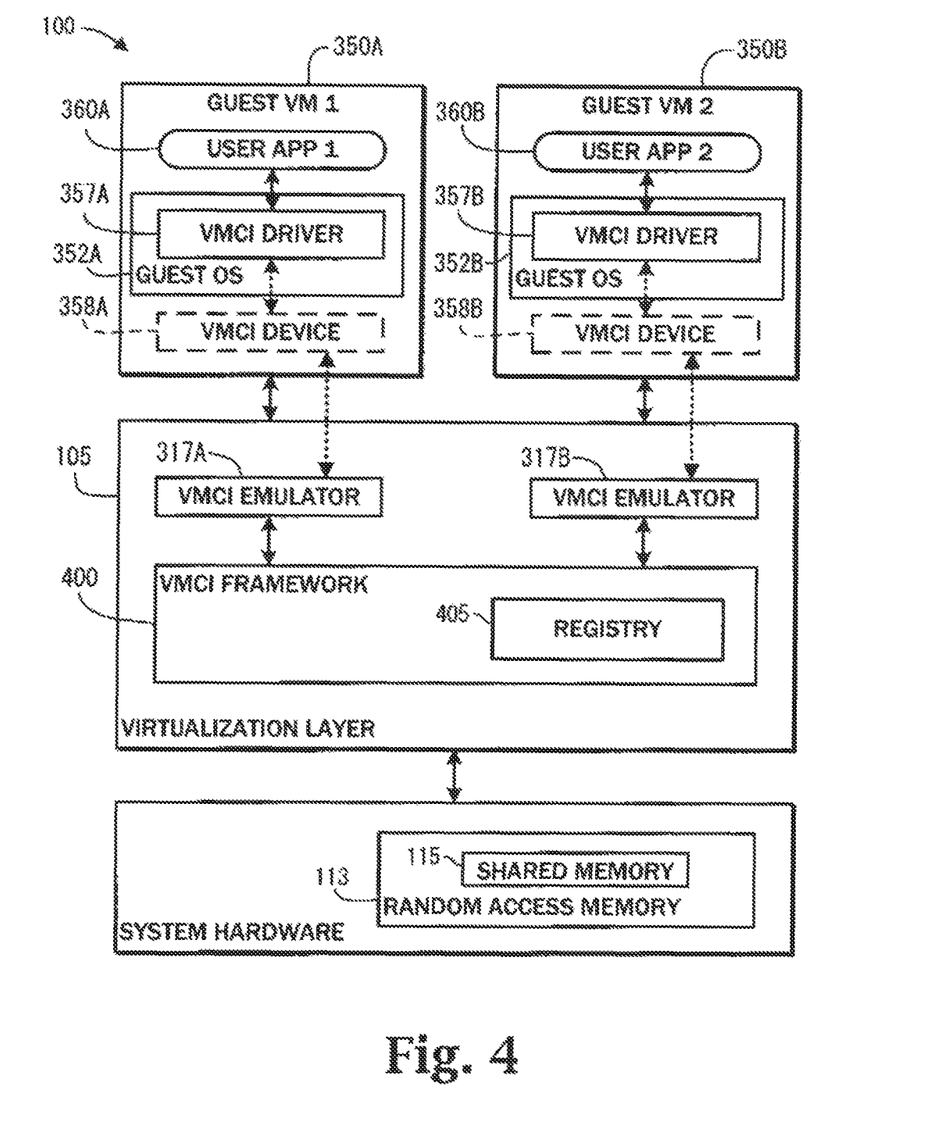
FIG. 4 shows a simplified version of virtualized computer system 100 having two guest VMs.

FIG. 4 shows a simplified version of virtualized computer system 100 having two guest VMs 350A, 350B. Although a host and console OSs are not shown in FIG. 4, one or the other may be considered to be included within virtualization software 105. Each VM includes a guest OS 352A, 352B on which a user application 360A, 360B executes. Guest OSs 352A, 352B each include a VMCI driver installed thereon for communication between user applications 360A, 360B and VMCI framework 400, which manages the VMCI communications interface as will be described in more detail below.

As described above with reference to FIGS. 2 and 3, each guest VM is a complete VM that includes not only a guest OS and applications, but virtual hardware, i.e., virtualized physical resources. The virtualized resources may include, for example, virtualized physical memory (referred to herein as "guest physical memory"), a virtual disk, and virtual I/O devices, including user interface devices, network interface devices, etc. In addition to these well-known virtual devices, the system includes a virtual VMCI device 358A, 358B in each guest VM 350A, 350B. VMCI devices 358A, 358B are shown in FIG. 4 with dashed outlines because they are "virtual devices," and therefore do not really exist within the guest VMs. Rather, the devices may be considered "projections" or "interfaces" consistent with what would be provided by actual physical devices. This "projection" is generated in the software domain by VMCI device emulators 317A, 317B, which run within virtualization software 105. Although VMCI devices 358A, 358B do not really exist within the guest VMs, they appear to exist from the perspective of guest OSs 352A, 352B and user applications 360A, 360B. In one embodiment, VMCI devices 358A, 358B are virtual PCI devices, using an interrupt and a small amount of device memory for its registers as described in more detail below. The main purpose of VMCI devices 358A, 358B is to provide a system call mechanism for calling from the guest to the hypervisor and vice versa.

Each OS, including host OS 152 (FIG. 2) and guest OSs 352A, 352B provide a context within which a user-level application can execute. A "context" generally includes the state of all virtual address space, as well as the set of registers (including privilege registers), with all hardware exception and entry points. A "context" can therefore be defined as a hardware platform that is either virtualized or non-virtualized. Thus, a context can be the state of virtual hardware associated with a VM, or the state of the physical hardware associated with a hypervisor, or the state associated with a host OS kernel. As stated previously, host OS 152 (FIG. 2) resides on a non-virtualized hardware platform because it executes directly on physical hardware whereas guest OSs 352A, 352B reside on virtualized hardware platforms since they execute on physical resources that are virtualized by VMMs 200A, 200B, respectively.

Each context can be assigned a unique identifier (ID) by a component in virtualization software 105, e.g., by VMCI framework 400. In one embodiment, VMCI framework 400 resides in a part of virtualization software 105 that can access the host as well as all the VMs on the host. For example, VMCI framework 400 may be a component of VMX 320 (FIG. 2) or VM kernel 202 (FIG. 3). In one embodiment, in a hosted virtualization system such as that shown in FIG. 2, the host OS's context is always given an ID of "0" (zero). In one embodiment presented by FIG. 2, guest OS 352A is assigned a context of "1" (one) whereas guest OS 352B is assigned a context of "2."

In one embodiment, a guest VM's context ID is generated based on the four lowest bytes of a VM's universally unique identifier (UUID). VMs can be assigned a UUID each time they are powered up. In one embodiment, for example, the UUID may be computed as an SHA1 hash of the current path of the VM's configuration file and the host UUID which is extracted from the host BIOS. VMCI framework 400 checks that the context ID generated from the VM's UUID is unique on the host when initializing the VMCI device. If a conflict exists, a delta value is added to the original context ID based on the maximum of the current host's context ID plus 1. To allow for some continuity so that a guest VM can retain its assigned context ID when the guest VM is paused and restarted or moved from one physical computer to another, the delta may, in one embodiment, be stored along with context ID. Furthermore, each time a guest VM is powered on, the UUID, which can be stored in the guest VM's configuration file, may be checked to see whether it has changed. If the UUID changes, then a new context ID may be generated. In this case, a change to the UUID is interpreted as the VM's having been copied or "cloned," which results in the assignment of a new UUID for the cloned VM.

In one embodiment, VMCI device 358 has a plurality of registers or ports which can be written to or read from using VMCI driver 357A, 357B. These ports are summarized in Table 1, below and include a status, control, interrupt cause, interrupt mask, hypercall, guest call, and capabilities registers.

TABLE 1

| Register | Function |
|---|---|
| Status | Read status of interrupts - enabled/disabled |
| Control | Reset device; enable or disable interrupts |
| Interrupt Cause | Read whether an interrupt is pending of a particular type |
| Interrupt Mask | Mask one or more bits of the interrupt cause register |
| Hypercall | Write hypercall - send data from VM to virtualization layer |
| Guest call | Read guest call - receive data from virtualization layer |
| Capabilities | Read hypercall/guest call capabilities of VMCI device |

The Status register reports the current status of the device as a bit vector. In one embodiment, it is a read-only register that allows a user program to determine the status of the device. For example, the status may be defined by one bit of the Status register, wherein a zero indicates that device interrupts are disabled and a one indicates that device interrupts are enabled.

The Control register may be used to control VMCI device 358. In one embodiment, this register is write-only, i.e., all reads return null or zero. Writing a 1 to a supported bit will result in a corresponding action taking place as summarized in Table 2 below. Writing a 0 has no effect. If a "1" is written to a reserved bit, the "1" will be ignored. In the embodiment shown in Table 2, one bit causes a VMCI device to reset, and additional bits are provided to enable and disable the interrupts.

TABLE 2

| Bit | Name | Action |
|---|---|---|
| 0 | VMCI_CONTROL_RESET | resets device to default |
| 1 | VMCI_CONTROL_INT_ENABLE | enables interrupts |
| 2 | VMCI_CONTROL_INT_DISABLE | disables interrupts |
| 3-31 | reserved | ignored |

The Interrupt Cause register is used to read and acknowledge device interrupts. In one embodiment, this is a read-only register similar to the status register. When the Interrupt Cause register is read, pending interrupts are acknowledged and the register is reset to zero. When an interrupt is raised by VMCI device 317, a bit in this register is set accordingly. Bits can be masked using the Interrupt Mask register described below. In one embodiment, only a single bit is used by this register. However, it is also possible to provide multiple types of interrupts with different bits indicating different interrupt types (or "causes"). When a bit is set to one, there is one or more unacknowledged interrupts of the corresponding type pending. When a bit is set to zero, there are no unacknowledged interrupts of the corresponding type pending.

The Interrupt Mask register may be used to mask out bits in the Interrupt Cause register. In one embodiment, this is a read-write register. When a bit is set to 1 the corresponding bit in the Interrupt Cause register is masked out and interrupts corresponding to this bit will not be raised. In order to preserve an existing mask a device driver can perform a read/modify/write. Since read/modify/write instructions can lead to races, which is undesirable, it is also possible to employ separate registers for setting and clearing mask interrupts. In this case, writing a 1 would cause the corresponding mask bit to be either set or cleared.

The Hypercall register may be used to implement hypercalls. As mentioned above, the term, "hypercall" is an abbreviated form of "hypervisor call" and generally refers to calls from a VM to virtualization software 105. Thus, this register provides a mechanism for a user application to communicate directly with VMCI framework 400 shown in FIG. 4. A hypercall may be implemented by, for example, causing a hardware exception error by executing an invalid instruction. The exception handler, which is part of virtualization software 105, could then switch out of the guest VM's context and perform necessary processing on behalf of VMCI emulator 317 or VMCI framework 400.

In one embodiment, the Hypercall register is a write-only register that has the side-effect of putting results of the hypercall into one of the processor registers, e.g., the EBX register for x86-based architectures. The EBX register is modified simply by causing the VMCI framework to write a new value in the stored processor state prior to switching back to the VM context. In one embodiment, the guest VM preserves the EBX register across hypercalls. In order to make a hypercall, the guest VM would create a data structure to define a "vector," which indicates the type of hypercall, and the entire size of the call. An exemplary data structure format is shown in Table 3. Here, the size of the call includes the size of vector, size itself, and the arguments. In one embodiment, the guest makes a REP OUTS of the entire struct to the hypercall register and the device forwards the data to VMCI framework 400 which maintains a table of vectors and matching functions pointers, as described in more detail below. As is generally known in the art, on systems based on x86 processor architecture, instructions "REP INS" and "REP OUTS" transfer data between the OS kernel (main memory) and a device via a designated device port. The REP prefex means that it will repeat the INS or OUTS until the ECX register reaches zero. This may be used to implement a data transfer between two devices on a bus such as an ATA or PCI bus that use the system's main processor as part of the data path. REP OUTS reads data from memory and writes the data to a designated I/O port. Once VMCI framework 400 receives the data structure, VMCI framework 400 may call a corresponding handler with the call struct. The handler is responsible for parsing the arguments and returning the result of the call in the EBX register of the virtual processor on which the access occurred. Control is then returned to the guest VM.

TABLE 3

```
struct vmciCallHeader {
    VMCI_Vector vector;
    uint32 size;
};
struct vmciCall {
    struct vmciCallHeader hdr;
    uint8 args[1];
}
```

Instead of putting the result of a hypercall to a processor register as described above, it is also possible to return the result using an IN. This has the benefit of not clobbering the register and downside of requiring the guest to make two device accesses which are potentially slower. In yet another embodiment, the result is included in the format defined in Table 2 above and the physical address of the result is then passed to the device instead doing a REP OUT. In this embodiment, the guest VM must have the physical address which is not possible/hard to do from user level. However, in implementations wherein hypercalls are not permitted directly from the user level, this would not be an issue.

In one embodiment, six different hypercall vectors are provided to support shared memory functionality. These hypercall vectors are summarized in Table 4 below. In implementing these hypercalls, it should be noted that programming effort may be minimized by providing corresponding operations in a user level library (not shown). Such a library may export functions that can, in a manner well understood by those skilled in the art, be called by any running application. Thus, the operations associated with each of the hypercalls described below need not be hand-coded into each user application.

TABLE 4

| Hypercall Type | Function |
|---|---|
| SM_CREATE | request shared region of physical memory be mapped to given GPPNs, obtain handle bound to the shared region. |
| SM_ATTACH | map shared memory assigned to a known handle to a given list of GPPNs. |
| SM_DETACH | reverse of SM_ATTACH |
| SM_QUERY | request size of shared memory associated with a known handle |
| SM_USID_BIND | bind a user-supplied reference ID to a handle |
| SM_USID_QRY | request handle bound to a given user-supplied reference ID |

The hypercall SM_CREATE involves sending VMCI framework 400 a list of GPPNs associated with a region of memory allocated by the guest for this purpose and receiving a handle generated by VMCI framework 400 that can henceforth be used to identify the region of physical memory that backs the guest physical memory.

The hypercall SM_ATTACH may be used to attach allocated guest memory to a pre-existing shared memory region by supplying VMCI framework 400 with the handle and list of GPPNs. The hypercall SM_DETACH is the reverse—the guest sends the handle to VMCI framework 400, which then demaps the GPPNs mapped to the shared region, e.g., by invalidating the mappings. The GPPNs may be left in an unmapped state until accessed by the guest, whereupon a pagefault will occur and virtualization software 105 can map an unused page using its pagefault handler in the normal process, which is well understood by those skilled in the art.

The SM_QUERY hypercall returns to the calling VMCI driver the size of a shared region associated with a given handle. This hypercall can be made in advance of the SM_ATTACH hypercall to ensure that the size of the allocated guest memory matches the size of the shared region.

The SM_USID_BIND hypercall binds a user (i.e, application) supplied identifier (USID) with a specific handle. This will allow a second application that is unaware of the handle to discover it using the commonly-known user supplied ID, which is agreed upon by the two applications in advance. This discovery can be performed, as described in more detail below with reference to FIG. 5B, by making an SM_USID_QRY hypercall, wherein the application supplies the identifier and handle.

Returning now to the VMCI device registers summarized in Table 1, the guest call register is used to pass data from the device to the driver. In one embodiment, the guest call register is read-only, i.e., writes are ignored. A guest call is the reverse of a hypercall. That is, guest calls originate in the hypervisor and end in the guest. In one embodiment, the guest call's data/wire format is the same as that for hypercalls as shown in Table 2 above. When VMCI device 358 receives a guest call request, e.g., from VMCI framework 400, it queues the guest call structure and raises the GUEST CALL interrupt. VMCI driver 357 may be responsible for acknowledging the interrupt (as described above with reference to the "interrupt cause" register) and reading the guest call via the guest call register. Multiple guest calls can be queued, in which case, the driver may read each one in sequence. The driver may be configured to mask the guest call interrupt (as described above with reference to the "interrupt mask" register) and instead just poll the guest call register. If no guest calls are pending, the register will return an error, e.g., "VMCI_ERROR_INVALID_VECTOR." If insufficient buffer space is provided to contain a pending guest call, VMCI device 358 may be configured to return a VMCI call header containing an error such as "VMCI_ERROR_MORE_DATA" as the vector and the size of the pending guest call. In one embodiment, it is the responsibility of VMCI driver 357 to call the function matching the guest call vector and pass along the arguments and their size. In alternative embodiments, the hypercall and guest call registers are implemented using separate data and status registers. In this case, the hypercalls would be passed via a REP OUT to the data register, and the status of the call may be read via the status register. Guest calls may be read via the data register and a status written out via the status register.

The Capabilities register may be used to report specific device capabilities to VMCI driver 357. In one embodiment, this register is read-only. If a capability is supported the device reports a 1, if not it reports a 0. In one embodiment, hypercall capability is reported by one bit of the register, e.g., bit zero, and guest call capability is reported by another bit, e.g., bit 1. Other bits may be reserved and/or ignored.

Figure 5A:
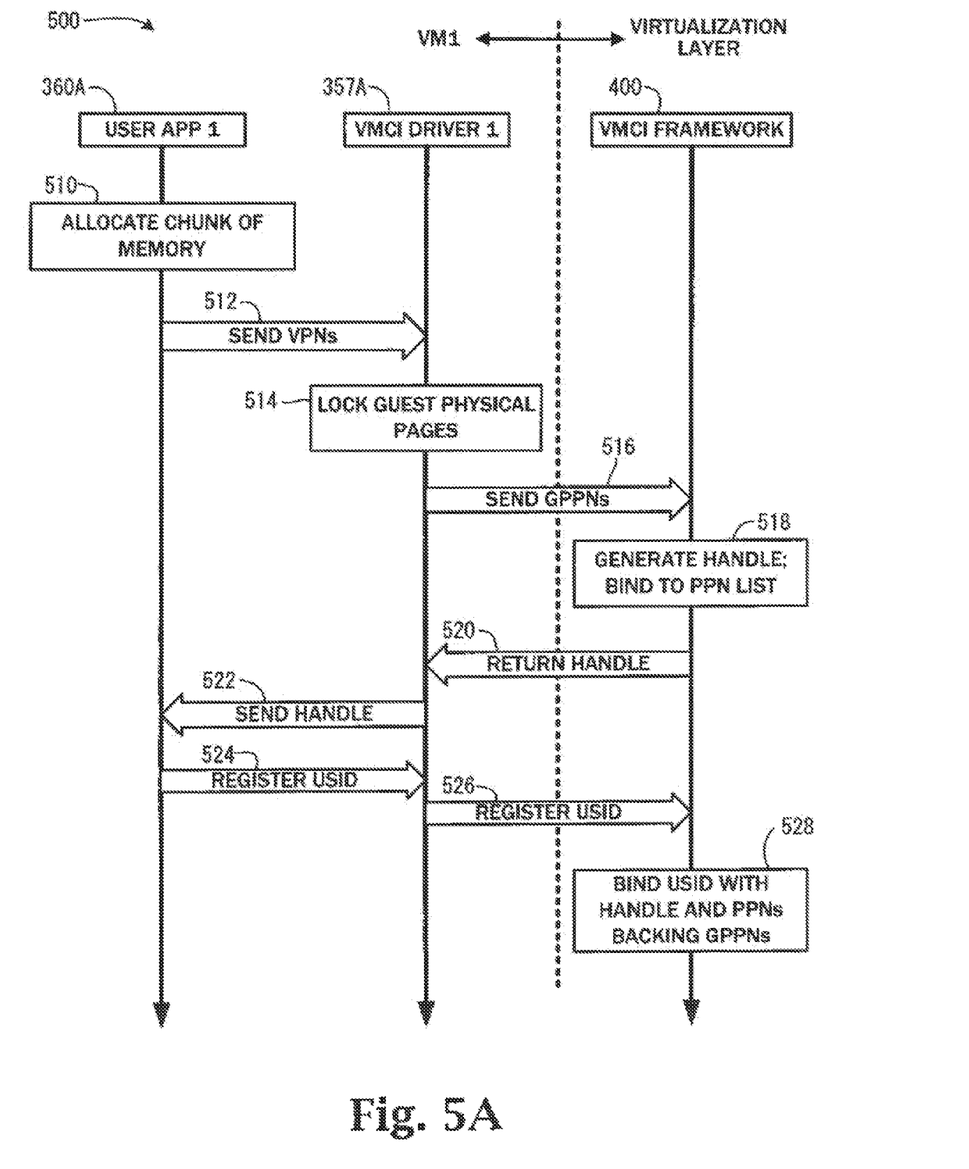
FIG. 5A shows a swim-lane diagram illustrating an exemplary procedure for setting up a shared memory space and registering the same with a VMCI framework.

FIG. 5A shows a swim-lane diagram 500 illustrating an exemplary procedure for setting up a shared memory space and registering the same with VMCI framework 400. This procedure will be explained with frequent references to FIGS. 2, 3, and 4. In this procedure, user application 360A, which resides in guest VM 350A, wants to share some memory with user application 360B, which resides in guest VM 350B. User applications 1 and 2 have previously agreed to a reference name for the shared memory. In operation 510, user application 360A allocates a chunk of virtual memory for the purpose of sharing it with user application 360B. Applications 1 and 2 may agree in advance on the size of shared region of memory. Alternatively, application 2 can query the size of the allocation as described below with reference to FIG. 5B. In one embodiment, the amount of memory allocated in operation 510 is required to match the size of the shared region.

In operation 512, user application 360A performs the SM_CREATE hypercall described above with reference to Table 4. The SM_CREATE requests a region of a given size to be created. In one embodiment, user application 360A sends the start address of the allocation of virtual memory and a size of the shared region. On receiving this hypercall, driver 357A identifies the guest physical pages that correspond to the virtual pages allocated in operation 510 and pins (or locks) these guest physical pages in operation 514. Typically, a guest maintains a mapping between the VPNs used by a process and corresponding GPPNs. However, an OS can decide to swap these backing GPPNs out and maintain a per VPN/GPPN entry bit that identifies whether a page is "paged out" or not. To prevent a guest OS from assigning a guest physical page being shared to another guest application, VMCI driver 357A simply calls a standard interface provided by the guest OS to pin the guest physical pages associated with the GPPNs.

In operation 516, the GPPNs are transmitted by VMCI driver 357A to VMCI framework 400 using the hypercall mechanism described above. In one embodiment, the vector of the hypercall identifies a corresponding procedure of the VMCI framework 400 that handles the hypercall. In this case, VMCI framework 400 receives the GPPNs and, in operation 518, generates a list of PPNs for physical pages that are mapped to the guest physical pages identified in the list of GPPNs received from VMCI driver 357A. VMCI 400 then generates a handle that can be used to refer to this list of PPNs, and binds the handle to the list. A binding is simply a reference that associates the one with the other. In one embodiment, framework 400 maintains a table (not shown) within registry 405 that maintains the bindings. For example, the table may include for each entry a field to store the handle and another field to store the list of PPNs, or a reference (i.e., pointer or memory address) to an array or linked list containing the PPNs.

In operation 520, VMCI framework 400 returns the handle generated in operation 518 to VMCI driver 357A. In operation 522, VMCI driver 357A passes this handle to user application 360A. In one embodiment, the handle is returned to user application 360A using the guest call feature described above.

In one embodiment, a discovery mechanism is provided to allow other applications to be able to discover the presence of the shared region and the handle associated with the shared region. In operation 524, user application 1, 360A accesses the hypercall port of VMCI driver 357A with the SM_UID_BIND vector in as described above to register the handle with registry 405 of VMCI framework 400. The hypercall data structure will include the handle and a user-supplied identifier (USID). The "users" of "user-supplied identifier" refers to user-level applications that are communicating with one another via the shared memory. The USID may be an arbitrary name or value agreed upon by user applications 360A, 360B. In operation 526, VMCI driver 357A then performs the hypercall, transmitting the data structure to a procedure of VMCI framework 400 responsible for handling SM_UID_BIND type hypercalls. In operation 528, VMCI framework 400 updates registry 405, binding the handle with the USID. In one embodiment, registry 405 comprises a table having for each entry, a field for a handle, a field for a USID associated with the handle, and a field identifying a list of PPNs associated with the handle.

Figure 5B:
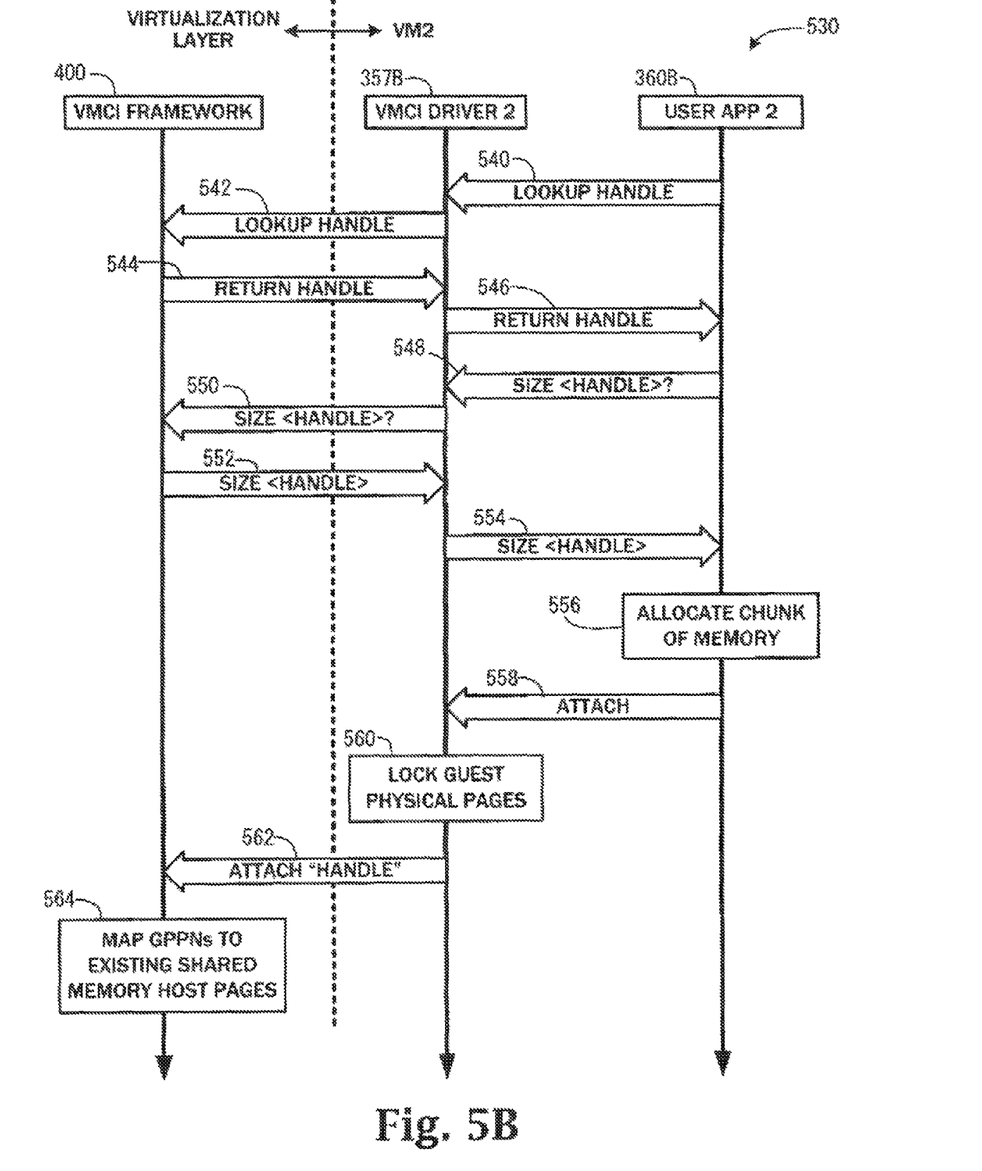
FIG. 5B shows a swim-lane diagram illustrating by way of example a procedure that a second application can follow to access a region of memory being shared by the first application.

FIG. 5B shows a swim-lane diagram 530 illustrating by way of example a procedure that a second application can follow to access a region of memory being shared by the first application. The procedure begins when user application 360B accesses the SM_USID_QRY hypercall port of VMCI driver 357B in operation 540. In this case, the hypercall data structure includes the USID agreed upon by user applications 360A, 360B. In operation 542, VMCI driver 357B performs the SM_USID_QRY hypercall.

In operation 544, VMCI framework 400 accesses registry 405, looks up the handle associated with the USID supplied by the hypercall, and returns the handle, e.g., using a guest call, to VMCI driver 357B. VMCI driver 357B then, in accordance with the guest call procedure described previously provides the handle in operation 546.

Operations 548, 550, 552, and 554 may be performed when the user applications have not agreed upon a size of the shared memory region in advance. In this case, user application 360B may discover the size of the shared region by performing the SM_QUERY hypercall (described above with reference to Table 4) in a manner similar to that described above with reference to operations 540-546. In this case, instead of discovering the handle associated with a known USID, application 360B is discovering the size of the shared region associated with a known handle, that is, the handle returned to user application 360B in operation 546.

In operation 556, user application 360B allocates a chunk of virtual memory. The size of the chunk of virtual memory matches the size of the shared region, e.g., as agreed upon in advance or as supplied in operation 554.

In operation 558, user application 360B performs an SM_ATTACH hypercall. This hypercall provides the handle associated with the shared region and the virtual address allocated in operation 556.

In operation 560, on receiving the SM_ATTACH hypercall, driver 357B identifies the guest physical pages that correspond to the virtual pages allocated in operation 556 and pins (or locks) these guest physical pages in the same manner as described above with reference to operation 514 of FIG. 5A.

In operation 562, VMCI driver 357B sends the handle and a list of GPPNs corresponding to the virtual memory allocated by user application 360B in operation 556 to VMCI framework 400. Then, in operation 564, VMCI framework 400 retrieves the PPNs associated with the handle and remaps the GPPNs to the physical pages identified by the PPNs. Once this operation is complete, the shared physical memory is mapped to both the first and second application, so that either may read or write to the common shared memory region.

It should be noted that there is no limit as to the number of applications sharing a particular region of shared memory. Furthermore, any application may, at any time, "detach" itself from the shared memory by issuing an SM_DETACH hypercall as described above with reference to Table 4. Virtualization software 105 may provide security provisions allowing only certain VMs to share memory or share memory with certain other VMs. In this case, prior to performing the mapping step described above with reference to operation 564, VMCI framework may consult a configuration setting to determine whether the particular VM requesting to be attached is permitted to do so according to the security configuration.

Implementing the communication between applications 360A, 360B, may require that one application write to an agreed-upon offset and that the other application poll that location on a periodic basis to determine what message, if any, was sent. Although perfectly serviceable, it may be desirable to avoid having to repeatedly poll a location in memory due to negative effects this type of operation has on performance. Thus, in one embodiment, three additional hypercalls and one additional guest call are provided to implement a notification feature. These calls are summarized in Table 5.

TABLE 5

| Hypercall Type | Function |
| --- | --- |
| DG_CREATE | request shared region of physical memory be mapped to given GPPNs, obtain handle bound to the shared region. |
| DG_DESTROY | map shared memory assigned to a known handle to a given list of GPPNs. |
| DG_SEND | reverse of SM_ATTACH |
| DG_RECEIVE | request size of shared memory associated with a known handle |

In one embodiment, notifications between different VMs are sent via notification endpoints. In order to send a notification from one context to another context, the first context creates, according to one embodiment, a notification endpoint and specifies a handle for both the source and destination endpoints. In this embodiment, VMCI framework 400 is responsible for routing the notification and also for enforcing access privileges, e.g., based on configuration settings of virtualization software 105.

Figure 6A:
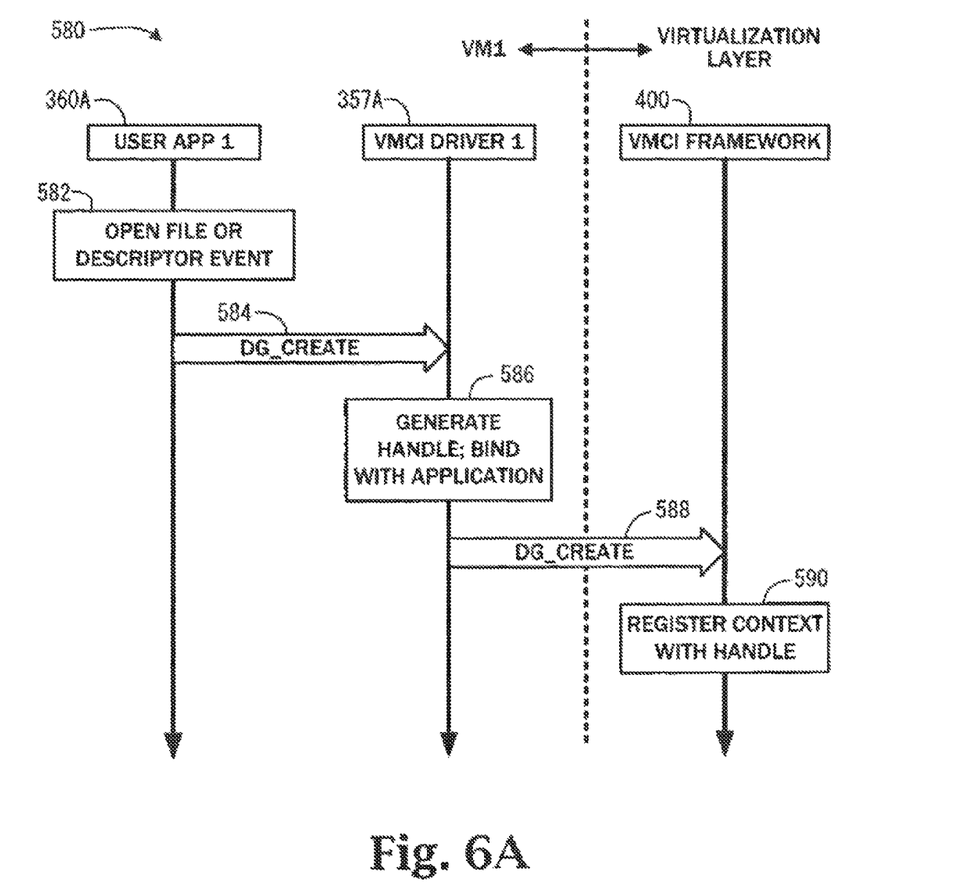
FIG. 6A shows a swim-lane diagram, which illustrates an exemplary procedure for creating a notification endpoint and registering same with the VMCI framework.

FIG. 6A shows a swim-lane diagram 580, which illustrates an exemplary procedure for creating a notification endpoint and registering same with VMCI framework 400. In operation 582, application 360A creates a notification endpoint by first opening a file descriptor or event that can be used to signal incoming notifications for the new endpoint. This file descriptor or event is used to signal the userlevel application from the guest VMCI driver when an incoming notification arrives. This is a standard way of signaling from an OS kernel level to the userlevel since it is generally not possible to call synchronously into userlevel from the OS kernel. Instead, the userlevel application opens a file descriptor or event handle to the driver which the driver can signal when it wants attention. The terms, "file descriptor" and "event handle" both refer to the same type of construct; the former relating to the Linux kernel, and the latter relating to the Windows OS. To determine when there is incoming data, the userlevel application simply polls the descriptor or handle. In one embodiment, the userlevel file descriptor or event handle is mapped onto a VMCI notification handle that can be used as a per-host unique way of identifying a specific endpoint. For example, a VMCI handle is unique per to the host and maps internally in the guest to a userlevel file descriptor or event handle, that is in turn used to signal the user level application.

In operation 584, user application 360A calls VMCI driver 357A which, in operation 586, generates a unique handle identifying the endpoint. Driver 357A then makes the DG_CREATE hypcercall to VMCI framework 400 in operation 588. VMCI framework 400 maintains a registry of handles and associated contexts from which they are received. As mentioned previously, virtualization software 105 (FIGS. 2, 3) assigns a context identifier to each VM, as well as a host OS, if one exists. Once a handle is bound to a context identifier, VMCI framework can forward notifications having a known destination handle to the proper context.

Figure 6B:
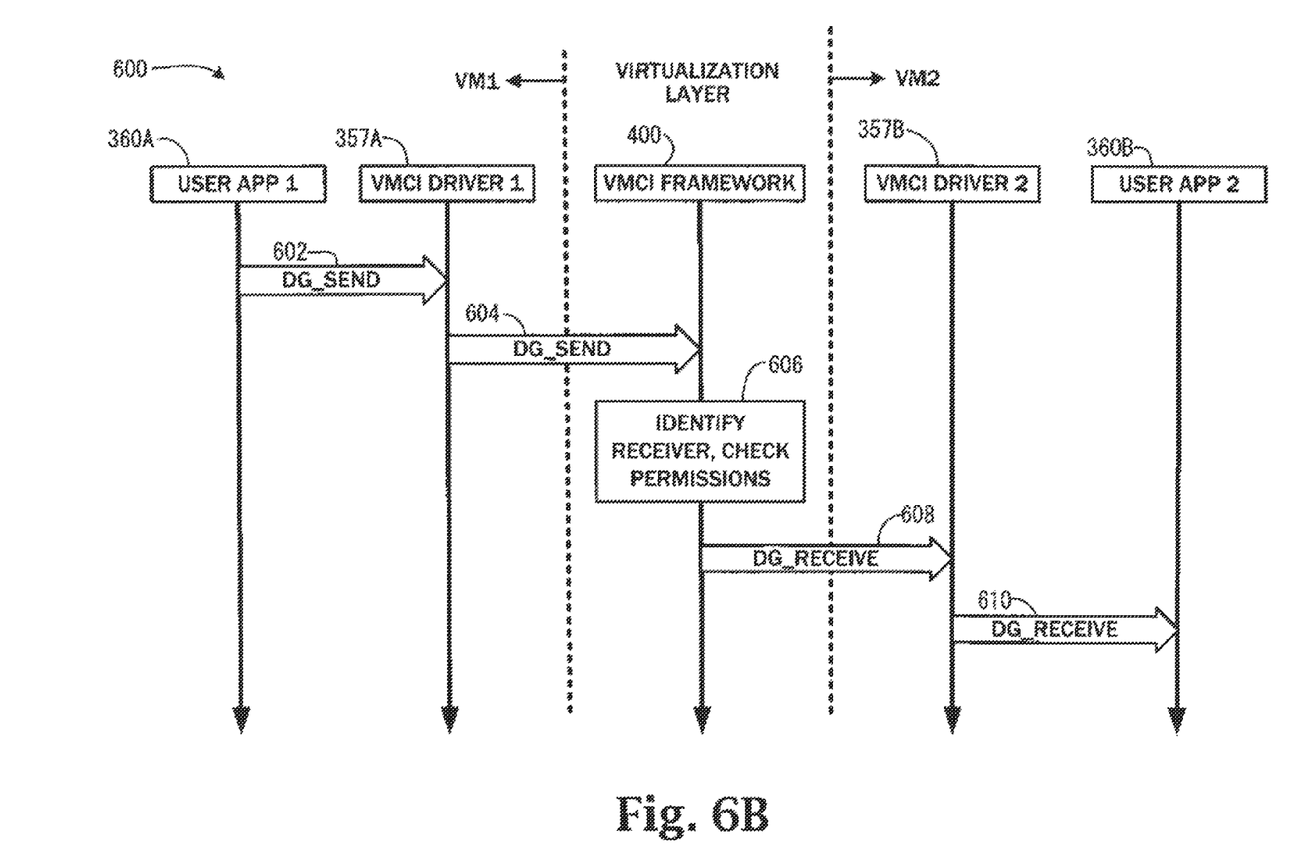
FIG. 6B shows a swim-lane diagram illustrating an exemplary procedure for transmitting a notification from a first application to a second application.

FIG. 6B shows a swim-lane diagram 600 illustrating an exemplary procedure for transmitting a notification from user application 360A to user application 360B. It is assumed that user application 360A is initially aware of the handle corresponding to user application 360B. Discovery of the handle can be performed using registry 405 in the same way that handles for shared memory regions are discovered, as described above with reference to FIGS. 5A and 5B.

In operation 602, user application 360A accesses the hypercall port of VMCI driver 357A using the DG_SEND vector. User Application 360A transmits a message payload plus the handle corresponding to the endpoint for User Application 2. Then in operation 604, VMCI driver 357A performs the hypercall to VMCI framework 400. As mentioned above, the vector provided with the hypercall may correspond with a handler routine of VMCI framework 400.

In operation 606, VMCI framework 400 accesses registry 405 to identify the appropriate context ID corresponding with the handle provided with the message received from VMCI driver 357A. Furthermore, VMCI framework 400 may check permissions to ensure that VM1, i.e., the sending VM, has permission to send notifications to VM2, the receiving VM. If VM1 lacks the adequate permission, then VMCI framework 400 may return an error message to VMCI driver 357A. Otherwise, VMCI framework 400 performs a guest call in operation 608 to VMCI driver 357B, which is identified by the context ID associated with the handle.

In operation 610, VMCI driver 357B identifies the application corresponding to the handle received with the message by the guest call, and triggers an interrupt or otherwise supplies user application 360B with the message payload.

An application can destroy a notification endpoint by making a DG_DESTROY hypercall to the VMCI framework 400. Upon receiving this hypercall, VMCI framework 400 will clean up its notification endpoint state and return to the calling context.

Referring briefly to FIG. 2, in one embodiment, VMCI driver 157 installed in host OS 152 provides an identical interface to VMCI drivers 357A, 357B discussed above. VMCI Driver 157 differs from VMCI drivers 357A, 357B, in that VMCI driver 157 can perform calls directly into the VMCI framework 400 without having to trap in and out of a VM context using a VMCI device emulator. Thus, applications 360 on host OS 152 have the same ability to share memory and send or receive notifications with applications running within VMs. Furthermore, when using a userlevel library to perform memory sharing and notifications-related functions, the same library may be used both on the host and within the VM. This means that an application using a VMCI library can run within a VM or on the host without having to recompile (assuming identical OSs).

The various embodiments described above may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments can also be embodied as computer readable code on a tangible computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The various embodiments may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

In addition, while described virtualization techniques have generally assumed that the VMs present interfaces consistent with a particular hardware system, persons of ordinary skill in the art will recognize that the techniques described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest OS that performs virtualization functions. Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the appended claims.

The invention claimed is:

1. A method for enabling inter-process communication between a first application and a second application, the first application running within a first virtual machine (VM) having a first guest memory in a host and the second application running within a second VM having a second guest memory in the host, the method comprising:
    receiving a request from the first application to create a shared memory region in physical memory of the host;
    as a response to the request from the first application, creating the shared memory region in physical memory of the host, a size of the shared memory region being agreed upon by the first and second applications, the shared memory region being associated with a handle and being mapped to a portion of the first guest memory of the first VM, the first guest memory of the first VM being virtualized memory of the physical memory of the host for the first VM;
    receiving a request to attach the shared region of memory to the second guest memory of the second VM, the second guest memory of the second VM being virtualized memory of the physical memory of the host for the second VM, the request being received by a framework from the second application, the request including the handle that uniquely identifies the shared region of memory and including an identification of the guest memory of the second VM, the framework being a component of a virtualization software in the host;

identifying a list of one or more physical memory pages in the physical memory of the host as a first portion of the shared memory region that corresponds to the first guest memory of the first VM;

identifying a second list of one or more physical memory pages in the physical memory of the host as a second portion of the shared memory region that corresponds to the second guest memory of the second VM; and mapping a portion of the guest memory of the second VM to the shared memory region in the physical memory of the host.

2. The method of claim 1, wherein the identifying of the list of physical pages comprises accessing a registry.

3. The method of claim 1, wherein receiving the request from the first application and creating the shared memory region include:

receiving a request to create the shared memory region, the request being received by the framework from the first application, the request including an identification of a plurality of pages of the first guest memory that correspond to a chunk of virtual memory allocated by the first application;

identifying one or more physical pages of the physical memory that correspond with a list of the first guest memory pages provided with the request, the one or more physical pages defining the shared region;

creating the handle; and returning the handle to the first application.

4. The method of claim 3, wherein the request to create the shared memory region is received through a hypercall.

5. The method of claim 3, wherein the first guest memory pages identified in the request to create the shared memory region are pinned.

6. The method of claim 3, wherein the framework binds the handle uniquely identifying the shared region with an identifier that is available to both the first application and the second application.

7. The method of claim 1, wherein the request to attach the shared region of memory to the second guest memory of the second VM is received through a hypercall, which is a call made from a VM to the virtualization software.

8. The method of claim 1, wherein the virtualization software further comprises a first driver loaded into the first virtual machine and a second driver loaded into the second virtual machine, the first driver providing an interface between the first application and the framework and the second driver providing an interface between the second application and the framework.

9. The method of claim 1, wherein the second guest memory of the second VM is pinned.

10. A non-transitory computer-readable medium embodying program instructions for causing a computer to perform a method for enabling inter-process communication between a first application and a second application, the first application running within a first virtual machine (VM) having a first guest memory in a host and the second application running within a second VM having a second guest memory in the host, the method comprising:

receiving a request from the first application to create a shared memory region in physical memory of the host;

as a response to the request from the first application, creating the shared memory region in physical memory of the host, a size of the shared memory region being agreed upon by the first and second applications, the shared memory region being associated with a handle and being mapped to a portion of the first guest memory of the first VM, the first guest memory of the first VM being virtualized memory of the physical memory of the host for the first VM;

receiving a request to attach the shared region of memory to the second guest memory of the second VM, the second guest memory of the second VM being virtualized memory of the physical memory of the host for the second VM, the request being received by a framework from the second application, the request including the handle that uniquely identifies the shared region of memory and including an identification of the guest memory of the second VM, the framework being a component of a virtualization software in the host;

identifying a list of one or more physical memory pages in the physical memory of the host as a first portion of the shared memory region that corresponds to the first guest memory of the first VM;

identifying a second list of one or more physical memory pages in the physical memory of the host as a second portion of the shared memory region that corresponds to the second guest memory of the second VM; and mapping a portion of the guest memory of the second VM to the shared memory region in the physical memory of the host.

11. The non-transitory computer-readable medium of claim 10, wherein the identifying of the list of physical pages comprises accessing a registry.

12. The non-transitory computer-readable medium of claim 10, wherein receiving the request from the first application and creating the shared memory region include:

receiving a request to create the shared memory region, the request being received by the framework from the first application, the request including an identification of a plurality of pages of the first guest memory that correspond to a chunk of virtual memory allocated by the first application;

identifying one or more physical pages of the physical memory that correspond with a list of the first guest memory pages provided with the request, the one or more physical pages defining the shared region;

creating the handle; and returning the handle to the first application.

13. The non-transitory computer-readable medium of claim 12, wherein the request to create the shared memory region is received through a hypercall.

14. The non-transitory computer-readable medium of claim 12, wherein the first guest memory pages identified in the request to create the shared memory region are pinned.

15. The non-transitory computer-readable medium of claim 12, wherein the framework binds the handle uniquely identifying the shared region with an identifier that is available to both the first application and the second application.

16. The non-transitory computer-readable medium of claim 10, wherein the request to attach the shared region of memory to the second guest memory of the second VM is received through a hypercall, which is a call made from a VM to the virtualization software.

17. The non-transitory computer-readable medium of claim 10, wherein the virtualization software further comprises a first driver loaded into the first virtual machine and a second driver loaded into the second virtual machine, the first driver providing an interface between the first application and the framework and the second driver providing an interface between the second application and the framework.

18. The non-transitory computer-readable medium of claim 10, wherein the second guest memory of the second VM is pinned.

* * * * *